Aug. 4, 1959   J. R. LOEFFLER   2,898,480
IMPULSE TIME PHASE SHIFTING CIRCUITS
Filed Dec. 18, 1956   2 Sheets-Sheet 1
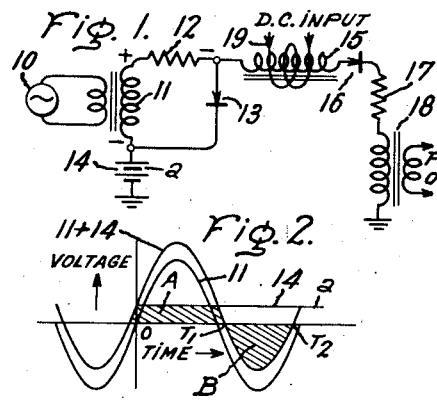
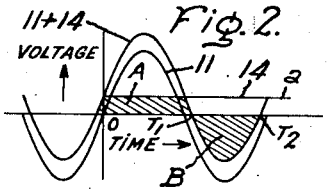
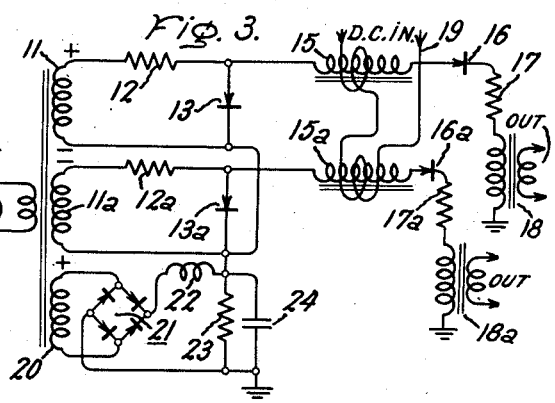
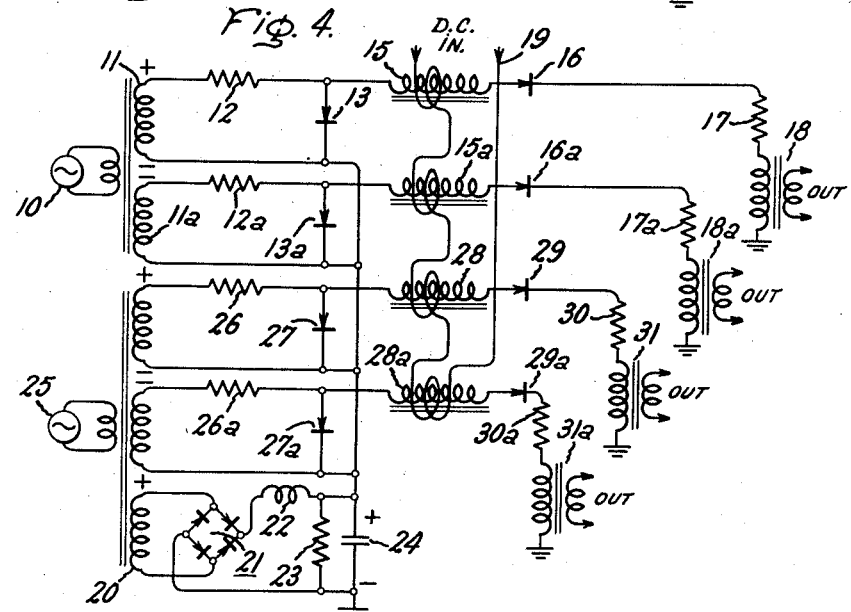
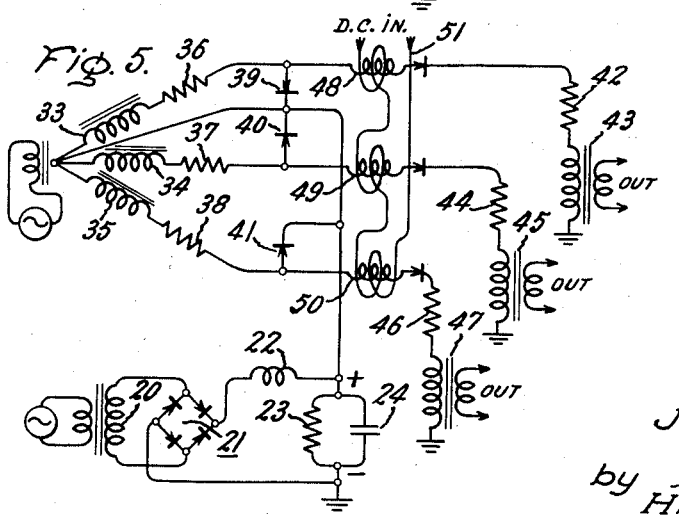
Inventor:
John R. Loeffler,
by [signature]
His Attorney.

Aug. 4, 1959     J. R. LOEFFLER     2,898,480
IMPULSE TIME PHASE SHIFTING CIRCUITS
Filed Dec. 18, 1956     2 Sheets-Sheet 2
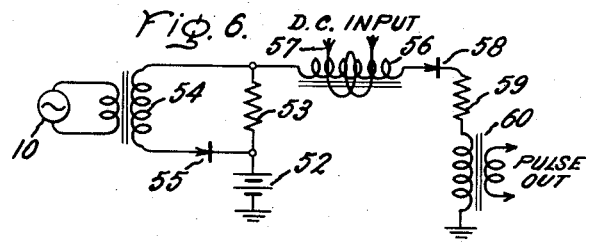
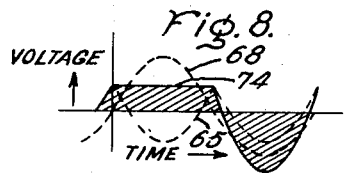
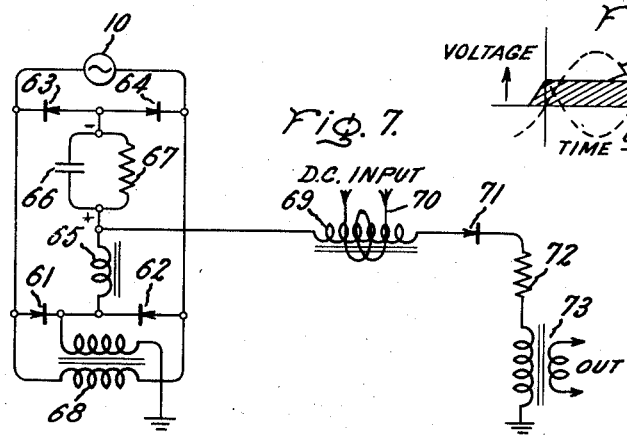
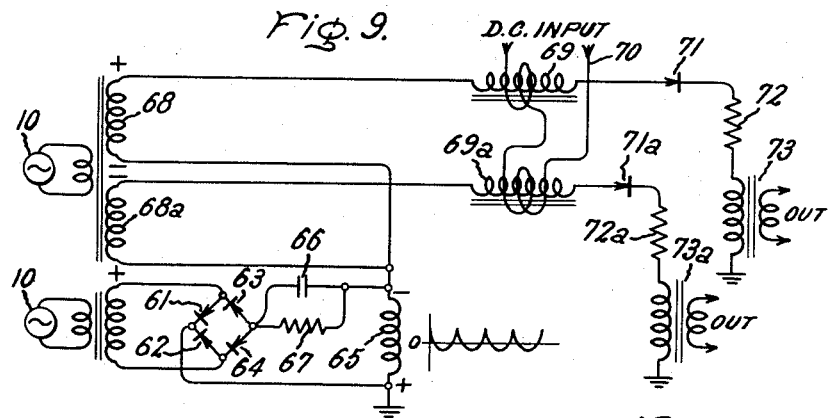
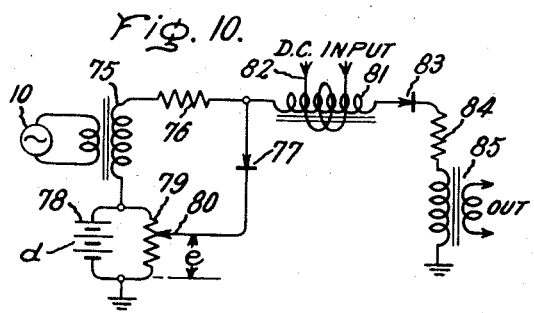
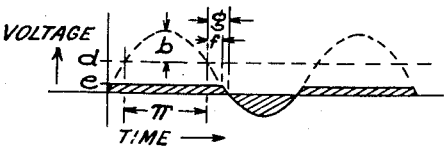
Inventor:
John R. Loeffler,
by *Claude A. Mott*
His Attorney.

2,898,480

IMPULSE TIME PHASE SHIFTING CIRCUITS

John R. Loeffler, Schenectady, N.Y., assignor to General Electric Company, a corporation of New York Continuation of application Serial No. 536,344, September 26, 1955. This application December 18, 1956, Serial No. 629,188

20 Claims. (Cl. 307—106)

This invention generally relates to impulse time phase shifting circuits and more particularly to impulse time phase shifting circuits utilizing magnetic amplifiers and finding particular applicability in systems for accurately controlling the conduction time of gas-filled electron tube rectifiers.

In regulating the flow of electrical power to a load, grid controlled gas filled electron tubes have been placed in series between the load and an alternating current power source, in various rectifier arrangements, and the conduction time of such tubes during each half-cycle of the alternating current source has been regulated to permit more or less power to reach the load in the manner of an electronic on-off valve. To positively control the desired conduction time of these tubes, means for generating time phase shiftable impulses have been used to energize the tube control grids at various instants during each half cycle to initiate tube conduction, and the tube thereafter conducts current to the load until the plate of the tube is energized negatively with respect to its cathode. Thus, the power passing through the tube to the load during each cycle occurs only during the interval between the initiating impulse and the negative energization of the tube; and by changing this interval by time phase shifting the occurrence of the initiating impulse, the power to the load may be similarly varied. To accurately control the "turning on" or "firing" of the tube, this initiating impulse should be a sharp edged triggering impulse of substantially uniform wave form and amplitude, irrespective of its time of occurrence during the cycle and independent of the sinusoidally varying amplitude of the alternating current power source, and additionally independent of any amplitude variations in the voltage of this power source. Moreover, to obtain wide range regulation of power over the full half wave of the alternating current source, the initiating impulse should be accurately time phase shiftable over this complete half cycle, or 180°. However, prior impulse phase shifters employing magnetic amplifiers that are known in the art have fallen short of meeting these desired requirements and do not provide "firing" impulses of uniform amplitude and wave form over a complete half cycle, nor impulses whose wave form and amplitude are independent of variations in the supply voltage. Conversely, such prior phase shifters have been dependent rather than independent of the power source, and they provide impulses of varying amplitude and wave form, dependent upon the degree of phase shift and dependent upon amplitude variations in the A.-C. source voltage. Additionally, the effective phase shifting range of these devices has been considerably less than one-half cycle, or 180°.

In accordance with the present invention, there is provided a means for transforming a sinusoidal alternating current wave into a recurring nonsinusoidal wave form having a substantially constant amplitude and wave form having the same time period as the sinusoidal alternating current supply, and being substantially insensitive to variations in the amplitude or wave form of the sinusoidal alternating current supply. In circuit with this transforming means is provided a switching means and a pulse forming means. By operating the switching means at any time during the constant amplitude portions of this nonsinusoidal wave, a voltage of predetermined constant wave shape and amplitude energizes the pulse forming means to provide an output impulse of constant wave shape and amplitude. Since the constant amplitude portion of the nonsinusoidal wave may be transmitted over more than one-half of a cycle of the A.-C. supply, or more than 180° referenced to its energizing sinusoidal supply wave, time phase shiftable output impulses of identical amplitude and wave shape may also be generated over a range of greater than 180°. Furthermore, since the constant amplitude portion of the nonsinusoidal wave is also substantially insensitive to variations in the sinusoidal supply, the amplitude and wave shape of such output impulses is also substantially insensitive to variations in the alternating current supply.

It is accordingly one object of the present invention to provide an improved time phase shifter for generating constant amplitude and constant wave shape impulses over a wide time range referenced to a sinusoidal reference source, that are substantially insensitive to variations in amplitude or wave form of the source.

Other objects and many attendant advantages of this invention will be more readily comprehended to those skilled in this art upon a detailed consideration of the following specification together with the accompanying drawings wherein:

Fig. 1 is an electrical schematic drawing of one preferred embodiment of the invention, Fig. 2 is a wave form time chart depicting the voltage relationships occurring within the circuit of Fig. 1, Figs. 3–5, inclusive, are electrical schematic drawings illustrating the circuit of Fig. 1 employed in full wave, two-phase, and three-phase applications, respectively, Fig. 6 is an electrical schematic drawing illustrating a variation in the circuit of Fig. 1, Fig. 7 is an electrical schematic drawing illustrating a second variation in the circuit of Fig. 1, Fig. 8 is a wave form time chart depicting the voltage relationships occurring within the circuit of Fig. 7, Fig. 9 is an electrical schematic drawing illustrating the circuit of Fig. 7 in a multi-phase application, Fig. 10 is an electrical schematic circuit similar to Fig. 1 and illustrating still another variation in the circuit of Fig. 1, and Fig. 11 is a wave form time chart depicting the voltage relationships occurring within the circuit of Fig. 10.

Referring now to Fig. 1 for a detailed consideration of one preferred embodiment of the invention, there is shown a sinusoidal alternating current generator 10, a means for transforming this cyclically recurring sinusoidal alternating current wave into a cyclically recurring nonsinusoidal wave having a substantially constant amplitude and wave form for more than one-half of the cycle of the alternating current wave and including a transformer 11, a resistor 12, a rectifier 13, and a direct current source 14; and "on-off" switching means, preferably comprising a self-saturable reactor circuit including the reactor 15 and one-way rectifier 16; and finally, a pulse forming means, preferably including a resistor 17 and a pulse forming transformer 18.

In accordance with this preferred arrangement, the direct current voltage source 14 is in series circuit relation with the secondary of transformer 11 and resistor 12 to self-saturable reactor 15 and associated rectifier 16, and finally to the primary winding of pulse forming transformer 18 through a resistor 17. Considering these series connected elements alone, it is observed from Fig. 2 that the voltage energizing the series connected saturable reactor 15 and pulse forming transformer 18 would be comprised of the sum of the D.-C. source voltage 14 plus the alternating current sinusoidal voltage 11 to yield a nonsymmetrical sinusoidal voltage having a greater positive area than its negative area. However, connected in shunt with the secondary winding of transformer 11 and resistor 12 is placed a rectifier 13 which operates to shunt all of the current of one polarity being generated by the transformer 11. Consequently, during the positive half cycle of source 10, when the upper terminal of transformer 11 is positive and the lower terminal is negative, current flows from this transformer through resistor 12 and is shunted through rectifier 13 back to the lower terminal of transformer secondary 11. As this current passes through resistor 12, a voltage drop occurs across resistor 12 which is equal and opposite to the voltage being generated by the secondary of transformer 11; and, therefore, the voltaeg generated by transformer 11 during this half cycle of the alternating current source is effectively cancelled out of the circuit. Consequently, the magnetic amplifier 15 and pulse forming transformer 18 are energized by only the constant D.-C. voltage from the direct current source 14 during this time interval. This is shown by the constant voltage lined area occurring between time 0 and time 1 in Fig. 2. Since rectifier 13, however, passes current only in one direction, it does not operate as a shunt for the negative half cycle of the alternating current wave when the upper terminal of the secondary transformer 11 is more negative and the lower terminal of transformer 11 is more positive. During this second half cycle of the alternating current wave, therefore, the series circuit comprising self-saturable reactor 15 and pulse forming transformer 18 receives the difference between the D.-C. voltage from source 14 and the negative half cycle of the sinusoidal wave, which difference is shown by the negative lined area in Fig. 2, occurring between time $T_1$ and $T_2$.

Observing Fig. 2 further, it is noted that this constant D.-C. voltage from source 14 occurs over a full 180° or one-half cycle of the A.-C. reference source and that this positive voltage then gradually diminishes as the negative going half of the cycle becomes larger and larger and eventually reverses the polarity of the voltage being transmitted to the saturable reactor 15. Consequently, it is noted that this arrangement provides a nonsinusoidal recurring signal which is of substantially constant amplitude and wave form over more than 180° of the alternating current wave source 10 and having a negative going portion, sinusoidally shaped, that occurs for less than 180° or one-half cycle of the alternating current reference source.

Before saturation, the impedance of self-saturable reactor 15 is extremely high and very little of this constant amplitude signal shown by the lined area A of Fig. 2 is transmitted through this reactor to the pulse forming transformer 18. However, if a saturating D.-C. current is applied to the saturating coil 19 of the reactor 15, the reactor 15 becomes saturated and its impedance drops substantially immediately allowing this constant amplitude potential to be passed through reactor coil 15 and thence through rectifier 16 and resistor 17 to the primary of pulse forming transformer 18.

Pulse forming transformers, as well known in the art, generate short time interval sharp edged impulses from their secondary windings that are proportional to the amplitude and wave shape of the signal energizing their primary winding. Consequently, whenever the primary winding of a pulse forming transformer input is energized by a signal of constant wave form and amplitude, its secondary winding transmits an impulse that is identical in wave shape and amplitude for each separate energization.

Thus it is seen that by generating a constant amplitude and wave shape signal through a controllable on-off switch to a pulse forming transformer 18, impulses of identical amplitude and wave shape may be generated over a wide range of time intervals referenced to an alternating current supply voltage which range may be made greater than 180° or one-half cycle of the alternating current supply. Furthermore, referring again to Fig. 2, it may be observed that since the positive going area A of the nonsymmetrical voltage is generated by the constant voltage D.-C. source 14, substantial variations in the supply voltage 10 have very little, if any, effect upon the amplitude or duration of this positive going portion. Consequently, this circuit is substantially insensitive to amplitude variations in the voltage supply 10 and variations in the wave form of the transformer voltage 11, and operates to generate constant amplitude and wave form phase shiftable impulses at any time during a full half-cycle of the alternating current supply, dependent upon the value of D.-C. energizing current controlling the saturation of reactor 15.

If a self-saturable reactor circuit is employed as the controllable on-off switching means, as shown in Fig. 1, it is, of course, necessary that the flux linkages across this reactor 15 return to the same value at the end of each full cycle of the nonsinusoidal wave or otherwise residual fluxes will build up and be absorbed in the reactor core; and the self-saturable reactor will progressively conduct earlier in the positive going portion of the nonsinusoidal wave than is commanded by the value of the D.-C. saturating signal energizing the saturating coil 19, and ultimately be placed in a fully saturated condition continuously. To prevent this from occurring and to insure that the saturable reactor may be accurately controlled by saturating current to conduct at any desired time instant during the positive going portion of the nonsinusoidal wave, it is necessary that the voltage area appearing across the reactor during the positive portion of the nonsinusoidal wave (A—Fig. 2) be made equal to or less than the voltage area appearing across this reactor during the negative portion of the nonsinusoidal wave (B—Fig. 2). In other words, the time-voltage integral of the voltage appearing as positive voltage across the reactor must equal or be less than the time-voltage integral of the voltage appearing as negative voltage across the reactor. This may be mathematically expressed as follows:

$$\pm N\Delta\phi = \pm \int e_L dt$$

where:

$e_L$ = the voltage across the reactor.
$N\Delta\phi$ = increase in flux linkages where $e_L$ is positive.
$-N\Delta\phi$ = decrease in flux linkages where $e_L$ is negative.

To make these flux linkages equal during both the positive going portion and the negative going portion, as shown by Fig. 2, means that the lined positive area A must be made equal to the lined negative area B. Since the area labeled A is substanatially equal to the product of the constant voltage source 14 and the time interval that this positive voltage is generated, and the negative going area B is equal to product of the rectified value of the sinusoidal alternating voltage 11 minus the D.-C. voltage $a$ and the time during which this is generated, it is obvious that in the circuit of Fig. 1, the value of the D.-C. voltage $a$ of source 14 must equal the average rectified value of a half-cycle of sinusoidal voltage $b \sin \theta$. Therefore, it can be shown that for this to occur, $a=b/\pi$ or $a=.318\ b$, where $a$ = the amplitude of D.-C. source 14,
$b$ = the maximum amplitude of the sinusoidal voltage.

In actual circuits that have been built and used, these theoretical values were very closely reached with $a$ in one instance being made equal to 28 volts, and $b$ being made equal to 88 volts.

Figs. 3, 4 and 5 illustrate the application of the basic circuit of Fig. 1 to a full-wave pulse generating arrangement, a two-phase full wave pulse generating arrangement, and a three-phase pulse generating arrangement, respectively.

In the arrangement of Fig. 3, two circuits identical with Fig. 1 are employed and energized by sinusoidal voltages 11 and 11a that are 180° out of phase. In other words, power transformer secondary 11 is reversibly wound with respect to power transformer secondary 11a whereby the upper circuit energized by this power transformer secondary generates a nonsinusoidal wave shown by the lined areas A and B of Fig. 2 and the lower circuit generates an identical nonsinusoidal wave that is 180° out of phase with that of Fig. 2. In this arrangement, therefore, time phase shiftable impulses may be generated by the upper circuit over substantially a full 180° of the positive going portion of the alternating current generator 10 and impulses may also be generated by the lower circuit over substantially the full 180° negative half-cycle of the alternating current power source 10.

It is noted in this circuit of Fig. 3 that the saturating coil 19 is in effect two saturating coils connected in series, one embracing the load winding 15 of the saturable reactor in the upper circuit and the second embracing the load winding 15a of the saturable reactor in the lower circuit. If these two coils are wound so that a direct current input signal aids the saturation of both load windings 15 and 15a, this circuit operates as a full wave pulse shifter as discussed above. However, these saturating windings may also be wound so that signals of one polarity entering the series connected saturating winding will aid the saturation of one of the load windings and signals of the opposite polarity will aid the other of the load windings. With this alternative arrangement, this circuit operates as a polarity discriminating pulse phase shifter that generates time phase shiftable impulses during either the positive going portion of the alternating current wave of generator 10 or the negative going portion of this wave, but not during both portions, all responsively to the polarity of the D.-C. signal entering the saturating winding connection 19.

In Fig. 4, four circuits identical with Fig. 1 are employed in a two-phase time phase shifting circuit, or otherwise stated, two circuits similar to Fig. 3 are employed; with one pair of circuits similar to Fig. 3 being energized by a sinusoidal alternating current supply 10, and a second pair of circuits similar to Fig. 3 being energized by a second sinusoidal source 25 that is 90° out of phase with source 10. Four pulse forming transformers 18, 18a, 31 and 31a, thus provide either full wave two phase or half-wave two phase, phase shiftable impulses, the first two transformers 18 and 18a providing either full wave or half-wave displaced impulses referenced to the first source of alternating current supply 10, and the second two pulse transformers 31 and 31a providing either full or half wave displaced impulses with reference to a second sinusoidal A.-C. supply 25 that is 90° out of phase with the first sinusoidal A.-C. supply 10.

Fig. 5 illustrates three of the circuits of Fig. 1 employed in a three-phase Y-connected circuit. The operation of each of these three circuits is the same as that of Fig. 1 and the three impulse forming transformer outputs 43, 45 and 47 provide phase shiftable impulses that are relatively displaced by 120°. Since all of these circuits of Figs. 3, 4 and 5 are merely multi-phase connections of the basic circuit of Fig. 1, a further discussion of their structure and operation is believed unnecessary.

It is to be noted that in each of Figs. 3, 4 and 5, rather than employing a D.-C. battery 14 as in Fig. 1, this direct current voltage may also be derived by full-wave rectification of the power source as shown by the full-wave bridge type rectifier arrangements shown in each of these figures. Such rectifiers, as is well known in the art, employ four bridge connected rectifiers or diodes 21 energized by an additional transformer secondary winding 20 of the power source transformer and are provided with a filtering network including an inductor 22 in series with a parallel circuit comprising a capacitor 24 and resistor 23.

Fig. 6 shows an alternative manner of generating a nonsinusoidal wave having a positive portion of substantially constant amplitude extending over more than 180° of the sinusoidal source 10. In this arrangement, the direct current source 52 is in series with a resistor 53 but electrically isolated from the transformer secondary winding 54 by a one-way rectifier 55. During the half-cycle of the sinusoidal source when the lower terminal of transformer secondary 54 is positive and the upper terminal is negative, current may flow through the rectifier 55 and a half-wave rectified sinusoidal voltage appears across resistor 53 in a direction to oppose the D.-C. voltage 52. Thus, during this half-cycle of the sinusoidal source 10, the saturable reactor switching means 56 and impulse transformer 60 are energized by the difference between the sinusoidal pulsating rectified voltage and a constant voltage source 52. Conversely, during the alternative half-cycle of the source 10, when the secondary winding 54 of the transformer generates a positive voltage on its upper terminal and a negative voltage on its lower terminal, rectifier 55 blocks the flow of current through the resistor 53, and the saturable reactor 56 and pulse transformer 60 are energized only by the constant voltage D.-C. source 52. This circuit, therefore, is quite similar in operation to the circuit of Fig. 1, differing, however, in that the circuit of Fig. 1 has a much lower impedance looking backward into the circuit from the magnetic amplifier than the circuit of Fig. 6. This results from the fact that in the circuit of Fig. 1, as current flows through the rectifier 13 during positive half-cycles of the transformer 11, the rectifier appears to the remainder of the circuit to be a short-circuit connection between the left-hand terminal of the saturable reactor winding 15 and the upper terminal of D.-C. source 14. Thus, the internal impedance of D.-C. source 14 presents the only backward looking impedance into the circuit of Fig. 1. On the other hand, in the circuit of Fig. 6, a resistor 53 is in series with the D.-C. source 52, and for this reason the backward appearing impedance is the combined impedance of the resistor 53 and the internal impedance of 52. Depending upon the impedances of the rest of the circuit and the application of this circuit, either the higher internal impedance of Fig. 6 or the lower internal impedance of Fig. 1 may be deemed more desirable.

Fig. 7 illustrates another alternative manner of generating a nonsinusoidal wave having a constant amplitude and wave form portion over greater than a full 180° half-cycle of a sinusoidal source 10. In this arrangement, the sinusoidal source 10 is connected to energize four rectifier elements 61, 62, 63 and 64 connected in a full wave bridge-type circuit to transmit a pulsating rectified D.-C. voltage through a filtering inductor 65 to the parallel circuit combination of a filtering capacitor 66 and resistor 67. Across the parallel combination of resistor 67 and capacitor 66 appears a constant D.-C. potential with the polarity indicated in the figure, and across the filtering inductor 65 appears a rectified D.-C. ripple potential 65 as shown in Fig. 8. The potential appearing at the junction of the inductor 65 and the parallel network of capacitor 66 and resistor 67 comprises, therefore, a D.-C. displaced full wave rectified ripple as shown in Fig. 8. To this wave form 65 to ground is added a sinusoidal voltage derived from source 10 through a transformer 68 whose secondary winding has a left-hand terminal connected to the lower terminal of inductor 65 and a right-hand terminal connected to ground. The polarity of this sinusoidal voltage from transformer 68 is made opposite to the polarity of the D.-C. displaced ripple signal appearing across inductor 65, with the result that the voltage generated to saturable reactor 69 and impulse forming transformer 73 is the difference between the full wave ripple 65 and the sinusoidal voltage 68 and is as shown by the lined areas in Fig. 8. The sinusoidal voltage generated by the secondary of transformer 68 is so adjusted as to have an amplitude equal to that of the amplitude of the ripple appearing across inductor 65 with the result that during the positive going half-cycle of the sinusoidal signal from transformer 68, the sinusoidal components of the ripple and of the A.-C. source cancel each other, yielding a constant amplitude and wave form D.-C. signal as shown by the wave form designated 74 in Fig. 8. Conversely, during the negative half-cycle of the sinusoidal source, the polarity of the ripple across inductor 65 is in aiding relation with the negative half-cycle of the sinusoidal source through transformer 68, yielding an increased negative potential. By properly selecting the step-down ratio of transformer 68 and the amplitude of sinusoidal source 10, the positive volt-time area of wave form 74 is made equal to or less than the negative volt-time area of this wave form, as shown by the cross lined areas in Fig. 8, and the desired nonsinusoidal wave having equal positive and negative volt-time areas is generated as in the circuits of Figs. 1 and 6.

To prevent spurious conduction of the saturable reactor 69 of Fig. 7, it is necessary that the positive volt-time area of the nonsinusoidal wave be made equal to the negative volt-time area, for the same reason as described above. To accomplish this, it can be shown that the D.-C. potential 65 across capacitor 66 should be made equal to twice the maximum value of the alternating current source 10, divided by $\pi$; which may be mathematically stated as:

$$\frac{2b}{\pi}$$

$$a = 2b/\pi = .637b$$

where $a$ = the direct current potential across capacitor 66
$b$ = the maximum amplitude of the A.-C. voltage In actual circuits built and used, the following voltages have confirmed this relationship:

$$a = 28 \text{ volts}$$
$$b = 44 \text{ volts}$$

Fig. 9 illustrates the circuit of Fig. 7 employed in a full wave time-phase shifter arrangement. In this arrangement, the full wave D.-C. displaced sinusoidal ripple appearing across inductor 65 is connected in opposing relation with two reversibly wound secondary transformer windings 68 and 68a, energized by a sinusoidal source 10. Thus, during a positive going cycle appearing across the upper transformer 68, this sinusoidal ripple is connected in opposition to the sinusoidal voltage across transformer 68, yielding a desired constant amplitude D.-C. signal to the saturable reactor winding 69 and pulse forming transformer 73. Similarly, during the opposite half-cycle of the sinusoidal source 10, the polarity across transformer 68a is reversed from that shown in Fig. 9 and is also in opposition to the D.-C. displaced ripple appearing across inductor 65 with the same result, so that the saturating direct current energizing the saturating windings of reactors 69 and 69a enable phase displaced impulses to be generated during both half-cycles of the sinusoidal source 10 over the output of pulse forming transformer 73 and 73a.

It is to be particularly noted that the circuits of Figs. 7 and 9 are both considerably simplified over the arrangements shown in Figs. 1 and 6 in that they do not require an additional resistor or rectifier corresponding to resistor 12 and rectifier 13 of Fig. 1 or resistor 53 and rectifier 55 of Fig. 6. Therefore, the circuits of Fig. 7 and Fig. 9 transmit the desired nonsinusoidal voltage with fewer components than either of these circuits.

To increase the constant voltage and wave form portion of the non-sinusoidal voltage beyond that obtainable from Figs. 1, 6 and 7, and considerably beyond 180°, the circuit of Fig. 1 may be modified as shown by Fig. 10. In this arrangement, a portion of the direct current voltage 78 which is added in series with the secondary of transformer 75 is also shorted out by the one-way rectifier 77. Consequently, during positive half cycles of the sinusoidal wave transmitted by generator 10, the remainder of the circuit, including self-saturable reactor 81 and impulse forming transformer 85, received only a portion $e$ of the D.-C. voltage 78 selected by the position of movable slider 80 over potentiometer 79, as shown by the positive going lined area in Fig. 11. Conversely, during the negative going portion of the alternating current source 10, the rectifier 77 does not pass current and the full value of D.-C. voltage 78 is opposed to the negative going sinusoidal wave appearing across the secondary winding of transformer 75. Thus, as shown by Fig. 11, the constant amplitude positive portion of the nonsinusoidal wave transmitted to the remainder of the circuit may be extended considerably beyond the 180° half-cycle of the sinusoidal source, enabling phase shiftable impulses to be transmitted by impulse forming transformer 85 over this much wider range as controlled by the direct current saturation of self-saturable reactor 81. In effect, therefore, this circuit of Fig. 10 provides a lower direct-current energization of the circuit during the positive portions of the nonsinusoidal wave and provides a greater direct current potential to oppose the sinusoidal wave during the negative going portion of the sinusoidal wave, thereby enabling the extension of the positive going portion considerably beyond that of the negative going portion in time and enabling a much wider range of phase shifted impulses to be generated by this circuit than can be obtained from the circuits of Figs. 1, 6 and 7.

Of course, it is obvious to those skilled in the art that the circuit of Fig. 10 lends itself readily to the generation of phase-shifted impulses that have a range of less than one-half cycle of the sinusoidal wave transmitted by generator 10. For example, in three phase application, where each pulse is 120° out of phase with the others, it is not necessary that the positive going portion extend for a full half-cycle of the sinusoidal wave transmitted by the generator 10. Other applications of phase-shifted impulses will occur to those skilled in the art where it is either not desirable or not necessary that the positive going portion of the nonsinusoidal generated wave extend for a full 180° C. In such applications the circuits of the various embodiments could easily be modified to generate a nonsinusoidal wave form having a positive going portion of less than 180° without departing from the spirit and scope of this invention.

In a like manner, the arrangement shown in Figs. 6 and 7 can also be modified as taught by Fig. 10 to extend the range of the constant amplitude positive going portion of the wave and therefore extend the range of the phase shiftable impulses.

In this circuit of Fig. 10, it can be shown that the following relationships are needed to obtain equal volt-time areas for both the positive and negative portions of the nonsinusoidal wave:

$$2 \pi \sin g = 2 \cos f + (\pi + 2f) \sin f$$
$$b = 1/e (\sin g - \sin f)$$
$$d = 1/e \sin g (\sin g - \sin f)$$

where $g$ = 1/2 the number of degrees that the positive portion of the nonsinusoidal wave extends beyond 180°
$b$ = the maximum amplitude of the alternating current wave
$d$ = the value of the D.-C. potential source 78
$e$ = the portion of the D.-C. potential selected by the potentiometer slider 80
$f$ = the number of degrees required by the sinusoidal wave to pass voltage $e$ to voltage $d$.

This application is a coninuation of application Serial

No. 536,344, filed September 26, 1955, now abandoned for "Wide Range Time Phase Shifting Circuits" in the name of the present inventor and assigned to the same assignee as the present invention.

Although preferred embodiments of the invention have been illustrated and described, it is believed obvious to those skilled in the art that many changes may be made in the circuitry disclosed without departing from the spirit and scope of this invention. This invention is, therefore, to be considered as being limited only by the following claims.

What I claim as new and desire to secure by Letters Patent in the United States is:

1. In an impulse time phase shifter, generating means responsive to a cyclically recurring sinusoidal wave for producing a cyclically recurring nonsinusoidal wave having the same time period and comprised of a positive going portion of substantially constant amplitude extending for at least one full half cycle of said sinusoidal wave and a negative going portion extending over the remainder of said sinusoidal wave and wherein the integral of the magnitude-time product of the positive going portion is substantially equal to the integral of the magnitude-time product of the negative going portion, impulse forming means responsive to energization by the positive portion of said nonsinusoidal wave for generating identical sharp edged impulses of short duration substantially coincident with each application of such wave, and a controllable on-off switching means interposed between said generating means and said impulse forming means for controlling the time instant of applying said nonsinusoidal wave and thereby controlling the time and phase shift position of said sharp edged impulses.

2. In an impulse time phase shifter, generating means responsive to a cyclically recurring sinusoidal wave for producing a cyclically recurring nonsinusoidal wave having the same time period and comprised of a positive going portion of substantially constant amplitude extending for at least one full half cycle of said sinusoidal wave and a negative going portion extending over the remainder of said sinusoidal wave and wherein the magnitude-time product integral of the positive going portion is equal to the magnitude-time product integral of the negative going portion, an impulse forming transformer responsive to energization by the positive going portion of said nonsinusoidal wave for generating identical wave form sharp edged impulses of short duration substantially coincident with each application of such wave, a self-saturable reactor having a power winding in series with said generating means and transformer, said self-saturable reactor having a saturating winding responsive to a direct current signal for variably controlling the time of saturation of said reactor during said positive going portion of the wave, whereby upon saturation of said reactor said positive going portion of the nonsinusoidal wave is applied to said impulse transformer resulting in the generation of an impulse having a time phase position controllable by the direct current signal applied to said saturating winding.

3. In an impulse time phase shifter, generating means responsive to a cyclically recurring sinusoidal wave for producing a cyclically recurring nonsinusoidal wave having the same time period and comprised of a positive going portion of substantially constant amplitude extending for at least one full half cycle of said sinusoidal wave, and a negative going portion extending over the remainder of said sinusoidal wave and wherein the magnitude-time product integral of the positive going portion is equal to the magnitude-time product integral of the negative going portion, and impulse forming means responsive to energization by the positive going portion of said nonsinusoidal wave for generating identical sharp edged impulses of short duration substantially coincident with each application of such wave, a self-saturable reactor having a power winding in series with said generating means and impulse forming means, said self-saturable reactor having a control winding responsive to a direct current signal for variably controlling the time of saturation of said reactor during said positive going portion of the wave, whereby upon saturation of said reactor said positive going portion of said nonsinusoidal wave is applied to said impulse transforming means resulting in the generation of an impulse having a time phase position controllable by the direct current signal applied to said control winding.

4. In an impulse time phase shifter, generating means responsive to a cyclically recurring sinusoidal wave for producing a cyclically recurring nonsinusoidal wave having the same time period and having a positive going portion of substantially constant amplitude extending for at least one full half cycle of said sinusoidal wave and a negative going portion extending over the remainder of said sinusoidal wave, an impulse forming transformer responsive to energization by the positive portion of said nonsinusoidal wave for generating identical sharp edged impulses of short duration substantially coincident with each application of said wave, and a controllable on-off switching means interposed between said generating means and impulse transformer for controlling the time instant of applying said nonsinusoidal wave and thereby controlling the time and phase shift position of said sharp edged impulse.

5. In an impulse time phase shifter, generating means responsive to a cyclically recurring sinusoidal wave for producing a cyclically recurring nonsinusoidal wave having the same time period and comprised of a positive going portion of substantially constant amplitude extending for at least one full half cycle of said sinusoidal wave and a negative going portion extending over the remainder of said sinusoidal wave, impulse forming means responsive to energization by the positive portion of said nonsinusoidal wave for generating identical sharp edged impulses of short duration substantially coincident with each application of said wave, and a controllable on-off switching means interposed between said generating means and said impulse forming means for controlling the time instant of applying said nonsinusoidal wave and thereby controlling the time and phase shift position of said sharp edged impulses.

6. In the apparatus of claim 5, said generating means including a means responsive to said sinusoidal wave for transmitting recurring half wave sinusoidal rectified impulses synchronized with half cycles of said sinusoidal wave, and means for connecting a source of constant direct current potential in series circuit with said transmitting means.

7. In the apparatus of claim 5, said generating means including a transformer having a primary winding adapted to be energized by said sinusoidal wave and a secondary winding, a resistor in series with said secondary winding, rectifying means in shunt with said series connected transformer and resistor, and means for connecting a source of constant D.C. potential in series circuit with said shunted resistor and transformer secondary winding.

8. In the apparatus of claim 5, said generating means including an impedance, means for transmitting half wave sinusoidal impulses across said impedance that are synchronized with alternate half cycles of said sinusoidal wave, and means for connecting a source of constant direct current potential in series circuit with said impedance and having a polarity in opposition with said half wave sinusoidal impulses.

9. In the apparatus of claim 5, said generating means including a transformer having a primary winding adapted to be energized by said sinusoidal wave and a secondary winding, a rectifying means and a resistor, said rectifying means and said resistor in series circuit connection with said secondary winding, means connecting the junction of said secondary winding and said resistor in circuit to energize one terminal of said impulse forming means, and means for connecting a source of constant direct current potential in circuit connection to energize another terminal of said impulse forming means and the series circuit junction of said rectifier and resistor.

10. In the apparatus of claim 5, said generating means including a transformer having a primary winding adapted to be energized by said sinusoidal wave and a secondary winding, rectifying means, an impedance, said rectifying means and said impedance being connected in series circuit relation with said secondary winding, and means for connecting a source of substantially constant direct current potential in series circuit relation with said impedance and electrically isolated from said transformer secondary winding by said rectifying means.

11. In the apparatus of claim 5, said generating means including means responsive to said sinusoidal wave for transmitting a cyclically recurring symmetrical wave having one component thereof comprised of a direct current potential and a second component thereof comprised of full wave rectified direct current impulses having a polarity in opposition to said direct current component, means responsive to said sinusoidal wave for transmitting a second sinusoidal wave having a maximum amplitude substantially equal to the maximum amplitude of said full wave rectified component, and means for adding said symmetrical wave and said second sinusoidal wave.

12. In the apparatus of claim 5, said generating means including rectifying means in a full wave rectifier arrangement energizable by said sinusoidal wave and having an inductor and a capacitor network in a filtering circuit connection therewith, a transformer having a primary winding energizable by said sinusoidal source and a secondary winding in series circuit with said inductor, whereby said nonsinusoidal wave is generated across the series circuit of said inductor and transformer secondary winding.

13. In the apparatus of claim 5, said generating means including a first direct current potential, means responsive to said sinusoidal wave for transmitting a second sinusoidal wave, means combining said second wave and first direct current potential in adding relation, one way rectifying means in shunt circuit relation with said combined direct current potential and second wave, and a second direct current potential in series circuit relationship with said rectifying means and poled in opposition to the conducting direction of said rectifying means, said second direct current potential having an amplitude that is smaller than the first direct current potential whereby current is shunted through said rectifying means only upon said combined first direct current potential and second wave exceeding the value of said second direct current potential.

14. In the apparatus of claim 5, said generating means including a direct current potential, means responsive to said sinusoidal wave for transmitting a second sinusoidal potential, means combining said second sinusoidal potential and direct current potential in adding relation, and means for limiting the maximum amplitude of one polarity of said combined potential to a value less than said direct current potential.

15. An impulse time phase shifting circuit comprising a generating means responsive to a cyclically recurring sinusoidal wave for generating a cyclically recurring nonsinusoidal wave having the same time period as said sinusoidal wave and having a positive portion of substantially constant amplitude and a negative portion of variable amplitude, an impulse forming means responsive to energization by said positive portion of said nonsinusoidal wave for generating sharp-edged impulses of short duration substantially coincident with said energization, and a controllable switching means for controlling the energization of said impulse forming means by said nonsinusoidal wave whereby said impulses may be generated at any point on said positive portion of said nonsinusoidal wave.

16. An impulse time phase shifting circuit as claimed in claim 15 in which the voltage area of the negative portion of said nonsinusoidal wave is at least equal to the voltage area of the positive portion of said nonsinusoidal wave and said switching means comprises a self-saturable reactor circuit.

17. An impulse time phase shifting circuit comprising a first means for generating a cyclically recurring sinusoidal wave, a second means for generating a cyclically recurring nonsinusoidal wave in response to said sinusoidal wave, said nonsinusoidal wave having a positive portion of substantially constant amplitude, an impulse generating means responsive to energization by said positive portion of said nonsinusoidal wave for generating sharp-edged impulses substantially coincident with said energization, and a switching means for controlling the time of energization of said impulse generating means whereby said impulses may be generated at any point of said positive portion of said nonsinusoidal wave.

18. An impulse time phase shifting circuit adapted to be energized by a cyclically recurring sinusoidal wave comprising means for generating a cyclically recurring nonsinusoidal wave in response to energization by said sinusoidal wave, said nonsinusoidal wave having a positive portion of substantially constant amplitude, an impulse generator responsive to energization by said positive portion of said nonsinusoidal wave for generating sharp-edged impulses, and switching means for controlling the time of energization of said impulse generator whereby said impulses may be generated at any point on said positive portion of said nonsinusoidal wave.

19. An impulse time phase shifting circuit as claimed in claim 18 in which the nonsinusoidal wave has a negative portion, and the integral of the volt-time area of the negative portion is at least equal to the integral of the volt-time area of the positive portion, and the switching means is a self-saturable reactor having a power winding in series with said impulse generator.

20. An impulse time phase shifting circuit as claimed in claim 18 in which the generating means comprises a transformer having a secondary winding, a source of constant direct current potential in circuit with said secondary winding and means for applying only said constant direct current potential to said impulse generator during positive half cycles of said sinusoidal wave.

References Cited in the file of this patent

UNITED STATES PATENTS

| | | |
|---|---|---|
| 2,175,335 | Andreiu | Oct. 10, 1939 |
| 2,689,322 | Godshalk et al. | Sept. 14, 1954 |
| 2,727,159 | Sunderlin | Dec. 13, 1955 |
| 2,787,755 | M. W. Smith | Apr. 2, 1957 |
| 2,788,442 | B. K. Smith | Apr. 9, 1957 |